United States Patent Office 3,359,116
Patented Dec. 19, 1967

3,359,116
PROCESS OF MAKING SOUR CREAM TYPE
PRODUCTS AND CREAM CHEESE
Lawrence L. Little, Creve Coeur, Mo., assignor to The
Battelle Development Corporation, Columbus, Ohio, a
corporation of Delaware
No Drawing. Filed Nov. 30, 1966, Ser. No. 597,862
20 Claims. (Cl. 99—54)

ABSTRACT OF THE DISCLOSURE

Sour cream type products or cream cheese are made by adding an edible acid to animal milk to which has been added .2 to 3.0% high monoglycerides (ratio of mono to diglyceride of at least 5:3) and a hydrophilic colloid. The milk containing the high monoglyceride and colloid is pasteurized and homogenized prior to being acidified. Lipoids in water can be substituted for the milk. Cream cheese prepared by this process requires milk containing 20 to 40% fat.

---

This invention is a continuation-in-part of my application Ser. No. 502,568, "Sour Cream" filed Oct. 22, 1965, now abandoned, which, in turn, is a continuation-in-part of my application Ser. No. 425,960, "Stable Non-Cultured Edible Dressing" filed Jan. 15, 1965, now abandoned, which, in turn, is a continuation-in-part of my application Ser. No. 173,833, filed on Feb. 16, 1962, entitled "Process for Making Acidified Dairy Products and Products Therefrom" now abandoned, which was a continuation-in-part of my United States patent application Ser. No. 104,233, filed Apr. 20, 1961, entitled, "Pasteurized Non-Culture Liquid and Plastic Milk Products and Processes for Making Same," now abandoned.

The invention relates to improvements in the manufacture of milk coagulum by the direct acid addition method and relates in particular to acid stabilizing and body building additions that effect superior sour cream and cream cheese products.

As is set forth in considerable detail by the aforementioned continuation-in-part patent applications, acidified milk products are conventionally made by treating milk with lactic acid producing bacteria which slowly acidify milk to effect casein coagulation. Where the ultimate product is sour cream, high butterfat content milk or cream is acidified.

The disadvantages of culturing are many and include the deleterious effects of contaminating organisms that survive pasteurization. The culturing process requires excessive expenditures of time within temperature ranges that promote the growth of such undesirable organisms. The result is frequently the production of a sour cream of inferior taste and/or texture.

In the preparation of coagulum for use as sour cream or cream cheese by the direct acid addition process, it is necessary to stabilize the milk base prior to the acid addition. Acids added directly to milk in a concentration to avoid undue dilution at ordinary temperature cause uneven casein coagulation and result in an unmarketable product. To stabilize the milk base against uneven coagulation in accordance with the aforementioned patent applications, hydrophilic colloid-forming vegetable gums are added to the milk base prior to the acid addition. Glycerides such as mono and diglycerides are added in the range of .01 to 1.00 percent to insure homogenization and effect a firm heavy body. Starch is included as an optional body building addition.

The above combination of ingredients are effective in preventing whey separation even upon prolonged storage and are effective in providing a firm, heavy body in the finished product. However, the body of the sour cream produced tends to be stringy and "ropey" which is objectionable. Also, the above-described ingredients tend to produce a viscous or gelled mixture before acidification. Such prematurely gelled mixture becomes lumpy and difficult to mix with the acid addition prolonging mixing procedures and causing excessive expenditure of man hours. This makes it difficult or impossible to process these mixes by continuous high-temperature short-time (HTST) methods of processing commonly employed in the manufacture of sour cream.

Additionally, a defective finished product often results because effective stabilizing ingredients are tied up by lumping and thus lost to the balance of the milk base during acidification.

I have now discovered that by the use of combinations of these ingredients in a manner not heretofore described (except as set forth in patent application Ser. No. 425,960), a particularly desirable firm bodied, nonstringy storable direct acid sour cream may be produced. By utilizing preferred embodiments of my discovery, premature gelling and lumping during mixing may be avoided. Particularly preferred embodiments of my process include the utilization of high mono content glyceride additions. I have found that such additions may be successfully employed as a single acid-stabilizing and body-building addition or may be utilized in combination with other acid stabilizing and homogenizing additions to effect a particularly desirable end product.

I have also found that by employing the preferred additions of the present invention it is possible to make a sour-cream type dressing from a low-fat milk base. This discovery is particularly significant since it enables one to produce a particularly palatable sour-cream dip or dressing of low calorie content. Low calorie dairy products are presently in high demand.

Conventional manufacture of cream cheese or Neufchatel cheese which involves the acidification of high cream content milk by bacterial culturing is particularly slow, cumbersome and uncertain. Additionally in spite of all precautions taken to be sure that the finally packaged product is not contaminated, this product frequently spoils on the grocer's shelf.

There are several methods for making cream cheese or Neufchatel cheese products in current use. All of these methods involve culturing which requires an incubation period of from 12 to 16 hours for the development of lactic acid. At the conclusion of the slow, and uncertain process of culturing it is necessary to separate the curd from the whey. The latter step is particularly crude and cumbersome and does not lend itself to modern, streamlined processing techniques.

For example in the presently utilized methods for making cream and Neufchatel cheese, milk or cream is standardized to a desired butterfat content (usually 10–18 percent, by weight), pasteurized (either hot or HTST process), homogenized (1500–2500 pounds of pressure while still hot) and cooled to about 70° C. About 2 percent to 5 percent of lactic acid starter culture is then added and mixed. Rennet may be added and if used it is usually added at a rate of about 1 ml. per 100 gallons of milk. After thorough mixing the milk is allowed to stand in a quiescent state until a curd forms, which, as stated above, usually required about 12 to 16 hours. After a firm coagulation (curd) is formed, the excess whey is removed in one of the two following procedures:

(a) One common method, called the "cold pack process," is to break up the coagulation and heat the milk to about 130° F. until a "break" (separation) occurs between the curd and whey. The product is then cooled to about 90° F. and salt is added as desired, cooling is continued to about 40° F. The curd is then transferred to clean muslin bags and stacked on racks and allowed to drain, as refrigerated, for 12 to 18 hours until sufficient whey has drained off so that the fat content (and moisture) meets Federal standards. During the draining period the muslin bags must be turned every few hours to hasten and promote uniform drainage. The product is then ready for packaging or sale (as refrigerated). The process derives its name "cold pack" from the fact it is not heated to pasteurizing temperature immediately prior to packaging. Because the product is not pasteurized immediately prior to packaging it has an extremely short shelf life and a high percentage of it is returned due to spoilage. Consequently the "hot pack method" (b) below is the one most frequently employed.

(b) The "hot pack" method is essentially the same as the "cold pack" method up to the point where the curd is taken from the muslin bags to be packaged. At this point the curd is transferred to a cheese kettle, consisting of a round bottom steam jacketed kettle with powerful agitators which have mechanically driven scraper blades that prevent the curd from sticking to the wall of the vat during cooking. The curd is heated (pasteurized) in this vat to a temperature of about 165° F. for a second time and homogenized a second time. The product goes from the homogenizer to the packaging machine where it is packaged while still at pasterizing temperature. The pasteurizing step improves the sanitary quality of the cheese product, and extends its shelf life.

The processes (a) and (b) above are both inefficient and difficult. Considerable curd is lost in the draining process, and being of high butterfat content, such loss represents a substantial economic disadvantage. Considerable labor is required for continual rotation of the muslin bags. Acid whey drainage on the floors of processing and cold storage rooms is very corrosive and will destroy concrete. Whey and residual butterfat on the floor of processing and storage rooms provide an ideal medium for undesirable bacteria, yeast and mold growth that tend to provide an undesirable contaminating environment for the draining cheese. The use of the hot pack process (which involves additional pasteurizing and homogenizing steps) is almost a necessity to provide satisfactory shelf life.

Further complications and disadvantages in the conventional processing include the fact that the extremely high viscosity of heated acid during pasteurization requires small batch processing and makes high temperature, short time processing impossible. Standardization of the fat and moisture content of the final product is crude and not susceptable to accurate control. To meet governmental regulations it is necessary to use a starting milk or cream of excessively high butterfat content to be sure that the butterfat content of the final product is adequate. The conventional processing techniques do not lend themselves to continuous efficient processing techniques.

There have been many attempts to devise new processing methods to improve on the above described conventional processing techniques or to circumvent the undesirable effects of such procedures. However, none have provided sufficient advantages to totally replace (a) and (b) above. For example, in one procedure a low fat milk is cultured to derive a low fat curd. After draining the whey, a very high butterfat cream (40 percent to 60 percent) is blended with the low fat curd to derive a product of the desired fat and moisture content. Such a mixture may then be pasteurized, homogenized and packaged while still hot. Although this technique provides more flexibility and control than conventional processing its reliance on culturing causes the final product to vary in quality and prevents the adoption of continuous processing techniques so that it has not replaced processes (a) and (b) above in its application.

I have now discovered that the method of the present invention may be utilized in a manner to produce high quality cream cheese (including within this term neufchatel cheese) in a far more consistant manner than has been heretofore known which eliminates the multitude of processing steps of the "hot pack" or "cold pack" procedures and which lends itself to "once through" continuous processing techniques. By utilizing my method which involves direct acid additions, the time required for culturing may be substantially eliminated, the consistancy of the product is assured, the curd forming and whey draining steps are eliminated, and the need for refrigeration of the final product is substantially reduced. My process possesses the desirable attributes of all of the prior known processes but suffers few of the undesirable features.

It is, therefore, the object of the present invention to provide improved coagulum in the direct acid addition method of coagulating milk.

It is also an object of the present invention to provide a direct acid method for making firm-textured sour-cream dressing or dip that is not stringy or ropey.

It is also an object of the present invention to provide a direct acid method for making cream cheese and Neufchatel cheese.

A further object of the present invention is to provide a method for making a low-calorie sour-cream dressing or dip.

A still further object of the present invention is to provide an addition for milk which will stabilize the milk for direct acid coagulation and which will provide desirable bodying qualities to the coagulum particularly for the production of sour cream, cream cheese and Neufchatel cheese.

Other objects and advantageous features of this invention will be apparent from the following detailed description.

In general, the present invention relates to the addition of monoglycerides to a milk base in the direct acid process for making milk coagulums, particularly coagulums for use as sour cream, cream cheese and Neufchatel cheese type products.

Where the monoglycerides are used in the manufacture of sour cream type products a preferred range of addition is from 0.12 to 3.00 percent, by weight. Starch may be partially substituted for the monoglycerides so long as at least 0.12 percent of the monoglycerides are present or starch may be wholly substituted therefore providing that from about .05 to 1.00 percent by weight addition of a hydrophilic colloid former is also made. The use of monoglycerides (0.12 percent minimum) accompanied by .05 to 1.00 percent additions of hydrophilic colloid formers is a preferred embodiment of the present invention.

The application of the present invention to sour cream type products provides an improved textured product while the application of this invention to the production of cream or Neufchatel cheese type products has been found to be a necessity to acquire an acceptable product by the direct acid method. In the application of the present invention to the production of these products the presence of at least 0.4 percent monoglycerides is essential and a preferred maximum monoglyceride addition is about 7.00 percent.

Monoglycerides are generally not obtainable in pure form but are combined with di and tri glycerides. Diglycerides are undesirable additives so that in the production of sour cream type products it is necessary to use a glyceride addition in which the mono to di-glyceride ratio is at least 5:3. In the production of cream or Neufchatel cheese type products such ratio must be at least 5:4.

Another preferred embodiment is that the glyceride addition have an iodine value of from 10 to about 120.

Another particularly preferred embodiment of the present invention is a unique mixture of high mono monoglycerides (as described above), acid stabilizers and emulsifying adjuncts which I have found can be used as a single addition in direct acid processing to provide a coagulum of far superior characteristics than has heretofore been known. This mixture is as follows:

| | Percent |
|---|---|
| Hydrophilic colloid former | 4.25–21.50 |
| Monoglyceride [1] | 21.0–63.00 |
| Emulsifying adjuncts | 10.5–73.5 |
| Salt | 0–21.50 |

[1] A glyceride mono-diglyceride showing a ratio of mono to diglyceride of at least 5:3 (5:4 where used to make cream cheese).

In one embodiment of the present invention, a milk base is stabilized with hydrophilic colloid-forming vegetable gums and monoglycerides are employed as the body-building addition. In this embodiment, starch may be substituted for the monoglycerides to effect a commercially acceptable firm-bodied nonstringy or ropey sourcream product. However, the use of monoglycerides is preferred.

In another embodiment of the present invention, monoglycerides are utilized as both the acid-stabilizing addition and the bodying agent.

Conventional commercially available glycerides commonly referred to as mono-diglycerides are generally unsatisfactory for utilization in conjunction with the method of the present invention. These materials are manufactured by reacting free glycerine with natural oil or fat or with fatty acids to obtain random distribution of mono, di and tri glycerides. Generally the monoglyceride content will range from 30 to 45 percent, by weight.

Neither di or triglycerides are substitutes for monoglycerides in the method or product of the present invention. Although not particularly damaging in the utilization of the method of the present invention, triglycerides are ineffective in materially altering either the body-building characteristics of the cream or in effecting acid stabilization.

The presence of diglycerides in sour-cream type dressing tends to produce a soft, stringy, runny, dressing which is characterized by a very weak body. The preferred net amount of pure monoglycerides used in this invention will range from about 0.12 to 3.00 percent although such monoglycerides will generally be incorporated into a mixture of glycerides including di and triglycerides. In any such mixture it is preferred that the monoglyceride content exceed the diglyceride content. Where the glyceride is substantially all mono and diglyceride, the monoglyceride should constitute at least 60 percent, by weight, of the mixture. Where the mixture consists of mono, di and triglycerides, the monoglyceride content should exceed the diglyceride content by a ratio of at least 5:3. By this means the glycerides may be added to fix the monoglycerides within the range of .12 to 3.00 percent without adding detrimental quantities of diglycerides.

Other impurities in commercially available glycerides such as glycerine and free fatty acids are generally present in only trace amounts and do not adversely affect the ultimate product.

Triglycerides are regarded as lipoids insofar as the present invention is concerned. Unless the quantity of triglycerides added raises the total lipoid content of the milk base to above a maximum of about 25 percent, such addition would not be objectionable and, in fact, may be purposely included for this purpose (about 40 percent in the case of cream cheese).

Although the monoglycerides used in this invention are very likely to be mixed with other glycerides (di and tri), inert organic materials and emulsifying agents, it is only the amount of monoglycerides alone relative to the other basic ingredients such as the milk base that is significant. Equally important is that the monoglyceride-diglyceride ratio, if diglycerides are present, does not go below about 5:3 (or 5:4).

Monoglycerides may be blended with products which aid in their dispersion. Said products may be inert organic materials such as propylene glycol and glycerine, or they may be emulsifying agents such as lecithin, polyisoethylene fatty acid esters, sorbitan esters, polyoxyethylene sorbitan fatty acid esters, polyglycerol esters, and other edible emulsifying agents which serve as dispersants for the monoglycerides and do not exert any significant deleterious effects on the sour cream product.

In regard to the amount of inert organic materials or emulsifying agents that may be blended with the monoglycerides, it would require approximately one part of these materials to 20 parts of monoglycerides to be effective. This would be the minimum amount. The maximum amount would be that amount at which these inert organic materials or emulsifying agents would become objectionable in the product. This maximum level is approximately 10 parts of the inert organic materials or emulsifying agents to one part of monoglycerides. In summary, the ratio of inert organic materials to monoglycerides that may be used in this invention ranges from about 1:20 to 10:1.

Special monoglycerides useful in the present process cannot be prepared by conventional processes but are prepared by further processing or purifying the conventional mono diglyceride to raise monoglyceride concentration. One method, among others, of this further processing is molecular distillation, which yields an extremely high-purity product, containing up to approximately 95 percent monoglyceride. Solvent crystallization, and perhaps other procedures familiar to those skilled in the art are available for further purifying and concentrating the monoglyceride portion of the conventional mono diglycerides.

In the case of high-mono content monoglycerides, prepared by molecular distillation which yields a product containing approximately 95 percent monoglyceride, it may be desirable to blend these products with a triglyceride or conventional mono diglyceride in order to improve their dispersability in aqueous solution. They may be blended with triglycerides in any proportion up to the limits cited above. If the monoglyceride is to be used in a dairy product containing substantial quantities of butterfat, the amount of nondairy fat should be kept to a minimum. In this instance, the monoglyceride might be blended with from 10 to 100 percent of its own weight of tri glyceride. A blend of approximately 80 percent of a 95 percent monoglyceride and 20 percent of a triglyceride makes an ideal monoglyceride for use in sour-cream type dressings containing butterfat.

If the monoglyceride is to be used in a substantially nonbutterfat product, the 95 percent monoglyceride might very well be combined with the entire amount of fat to be used in the product. For example, assume a formulation of imitation sour cream in which the finished product would contain 18 percent vegetable shortening and 0.50 percent of a 95 percent monoglyceride. Thus, 18 pounds of vegetable shortening and 0.50 pound of 95 percent monoglyceride could very well be combined into one product which would be added to other ingredients to make a 100 pound batch of imitation sour cream. This combination would simplify the procedure of making up the batch and would insure the proper dispersion of the monoglyceride. In this cited example, a product containing 97.3 percent of vegetable shortening and 2.7 percent of 95 percent monoglyceride would be used in the imitation sour-cream product at the rate of 18.5 percent. It would provide 18 percent fat and 0.50 percent of 95 percent monoglycerides in the product.

The special glycerides described above may be blended with other ingredients to facilitate their dispersion in the mix or for convenience in making up the mix. The composition of the special glyceride is not critical other than the ratio of monoglycerides to diglycerides in the product as discussed above. A minimum diglyceride is preferred with the maximum percentage of diglycerides in the glyceride addition being about 37.5 percent. The maximum diglyceride addition to the milk itself is about 1.12 percent, by weight. The minimum percentage of monoglycerides is 62.5 percent of the special glyceride addition and about .12 percent, by weight, of the milk.

It has been found that the minimum of 0.12 percent, by weight, of the special glyceride in the dressing is essential for firm body and prevention of whey separation during storage. Normally, 2.50 percent of the special glyceride in the finished dressing is all that is required even in a dressing containing the very minimum percentage of fat (.50 percent). The preferred range of monoglycerides used in this invention is 0.12 to 3.00 percent, by weight. Higher amounts of special glycerides are not objectionable and dressings containing amounts in excess of this are not excluded from this invention. Since the special (high-mono content) glycerides described in this invention are free of any objectionable odors or flavors and are wholesome and nutritious food products, the only objection to using excessive amounts of these special glycerides would be a slight increase in the cost of the product. Where the monoglyceride addition exceeds about 3.00 percent, it is regarded as a lipoid addition and is excessive only if the total lipoid content of the milk base then exceed that which is regarded as desirable. The maximum of about 3.00 percent encompasses the maximum addition one would normally desire to effect as a bodying agent or acid stabilizer.

The natural fats, oil or fatty acids used in preparing the mono diglycerides from which the high monoglycerides are prepared may be unhydrogenated or partially hydrogenated. Complete hydrogenation is not desirable because it has been found that generally these special high-mono content monoglycerides are more effective when they have an iodine value of from 10 to about 120. Maximum effectiveness is usually obtained in the range of iodine values of 30 or more.

The use of high-mono monoglycerides as both the acid-stabilizing and body-building agent for sour-cream-type products makes the preparation of these products extremely simple. In this application, the special monoglycerides perform the multiple function of preventing uneven or hard curd formation when the acid is added to the cream; it also promotes the formation of a smooth-textured, creamy product free from lumps and graininess. It promotes the development of a firm, heavy body that is desired in products of this kind.

Although the monoglyceride addition of the present invention may be employed to perform the dual function of acid-stabilizer and body-building agent, to obtain optimum quality sour-cream products it is desirable to employ acid stabilizers along with the glyceride addition. Such acid stabilizers are materials which form hydrophilic colloids in the milk base and which are disposed to prevent premature coagulation until a uniform acid-milk mixture is attained within the desired pH range. The known suitable stabilizers include the hydrophilic colloid-forming vegetable gums such as agar, locust bean gum, guar gum, cellulose guy, carrageenam, Danish agar, gum tragacanth, and gum arabic. Another known suitable hydrophilic colloid-forming acid stabilizer that is useful for the present process is gelatin. Although gelatin is not a vegetable gum, for the purposes of the present application and claims it shall be included with this group of materials by the term "vegetable gum." These additions are effective when employed within the range of from about .05 to 1.00 percent, by weight, of the milk and particularly desirable sour-cream products are obtained when the milk is first stabilized with this addition prior to acidification.

Where acid stabilizers are employed in the manufacture of sour cream and the function of the monoglyceride addition is primarily to add body to the mixture starch may be substituted for a portion or for all of the monoglyceride addition, however, the use of monoglycerides is by far the preferred embodiment of the present invention since the utilization of monoglycerides provides a cream of superior body and texture as compared to the complete utilization of starch for this function.

The use of emulsifying adjuncts either where monoglycerides perform the dual function as acid-stabilizer and body-building agent or where additional acid stabilizing additions are made are desirable. The function of such additions is to effect easy mixing and emulsification of the glycerides and lipoids of the mixture.

The known useful emulsifying adjuncts include the caseinates such as casein (acid), sodium, ammonium and potassium casenite, lecithin, proteins such as soy, proteins and neutral salts with polyvalent anions. Examples of neutral salts which can be used as emulsifying adjuncts are the sodium, potassium, and ammonium salts of orthophosphates, polyphosphates, citrates, tartrates, and sulfates. Many additional salts, not listed, are suitable for use as emulsifying adjuncts. Such emulsifying adjuncts are added in amounts up to about 2.5 percent, by weight.

Some specific examples of orthophosphate neutral salts which may be employed as the emulsifying adjuncts are the mono basic diacid phosphates, dibasic mono acid phosphates, or even the tribasic phosphates, such as monosodium phosphate, disodium phosphate, or trisodium phosphate. The condensed or polyphosphates include the tetra or dibasic salts or pyrophosphate, the hexametaphosphates, the tripolyphosphates, etc. The citrates and tartrates and other polyvalent acid salts could be either the mono, di or tribasic salt o fthe various acids, depending on the valence of the various acid anions. Specifically, this included di and tri sodium citrates, mono and disodium tartrate, etc.

In this comprehensive list of polyvalent anion salts, the pH of the various salts covers a range of approximately 3.5 to 11.5. However, the pH of the particular salt is of no great significance because the high buffering capacity of protein in the formulation prevents any drastic shift in the pH of the product during the critical stages of pasteurization and homogenization. When the product is acidfied, the amount of acid is adjusted to compensate for the acidity or alkalinity of the salt that is used.

For example, if monosodium phosphate, which has a pH of approximately 4.5, were used, the amount of acid used to acidify the product would be reduced slightly so as to give the desired pH of approximately 4.40. If trisodium phosphate were used, it would have a very significant neutralizing effect and would require more acid to be added to reduce the pH to the desired level of approximately 4.40. The use of these polyvalent anions in food compositions in described extensively in the prior art under various applications and descriptions. However, the novelty of using these salts is in the use of any one or more of them in combination with the very specific type (high-mono content) of monoglyceride emulsifying agent.

The proteins that are suitable as emulsifying adjuncts for this application are also very extensive. Suitable proteins in order of preference are caseinates, isolated vegetable proteins such as those from soy beans, peanuts, cottonseed, sesame seed, wheat, etc. Vegetable flours high in protein are soy bean flour, wheat flour, sesame flour, peanut flour, cottonseed flour, etc. These vegetable flours which are high in protein need to be refined and processed so as to remove their natural flavor. They are preferably de-fatted, although this is not absolutely essential. Animal proteins include milk albumin, egg albumin, egg yolk, gelatin, fish meal, etc.

Any material that is capable of acidifying milk to the desired pH and which does not render the curd deleterious for human consumption may be employed as the acid addition. In addition to lactic acid, readily useable acids include hydrochloric acid, phosphoric acid, pyrophosphoric acid, citric acid, tartaric acid, fumaric acid, maleic acid, adipic acid, succinic acid, and acetic acid. Many of the aforementioned acids are available commercially in specific food grades that are ideal for the present process. Such acids or acidifying materials should be employed in a relatively concentrated form and preferably should be of such concentration as to acidify the milk to prevent a thin, watery product. Preferably the acid addition will be of such a concentration as to not exceed about 5 percent of the weight of the milk. For the purpose of the present specification and claims, the meaning of the word "acid" and the term "edible acid" shall include materials that are capable of acidifying milk without undue dilution. For example, acidogens, such as D-glucono-delta-lactone, can be employed as the acid addition.

Thus, it may be seen that in the manufacture of sour cream from a milk base by the direct-acid method wherein the milk is stabilized with from about .05 to 1.00 percent of a hydrophilic coloid-forming vegetable gum, a superior nonstringy heavy-bodied product is obtained by the addition of from about .20 to 3.00 percent of monoglycerides and/or starch. It is additionally noted that the monoglycerides are preferred over the starch addition since they effect a significantly superior product. Further, the monoglyceride addition may be used alone and will perform the dual functions of acid-stabilizer and body-building agent although the presence of a hydrophilic colloid-forming vegetable gum within the range of from about 0.05 to 1.00 percent is preferred.

Although the sequence of addition will generally be (1) acid stabilization addition, (2) monoglyceride and/or starch addition, and (3) acidifying addition, I have found it to be particularly convenient to premix the acid stabilizer with the monoglyceride addition and other preferred adjuncts such as emulsifying agents to form a single addition material to add and mix with the milk base prior to acidification. A single addition mixture of ingredients which I have found to yield sour cream of significantly superior texture characteristics is the following:

|  | Percent by weight |
|---|---|
| Vegetable gums (including gelatin) | 4.25–21.50 |
| High mono monoglycerides (as defined above) | 21.00–63.00 |
| Emulsifying adjuncts | 10.50–73.50 |

The term "milk base" of the present invention as applied to the manufacture of sour cream is any liquid capable of protein coagulation and includes both natural animal milk and equivalent artificially prepared milk. Conventional sour cream is made from high butterfat milk or cream having a butterfat content of about 18 percent, by weight. Sour cream may be made by the present method from a milk base wherein a portion or all of the butterfat content has been removed and replaced with lipoids other than dairy fat. For example, the milk base may consist of milk or skim milk containing one or more of the lipoids butterfat, sunflower seed oil, coconut oil, palm oil, palm kernel oil, whale oil, corn oil, cottonseed oil, peanut oil, olive oil, lard, cocoa butter, tallow, soy bean oil, safflower oil, synthetic triglycerides. These lipoid materials may be unhydrogenated, partially hydrogenated or completely hydrogenated. They may be bleached, acetylated, or rearranged, or otherwise processed or modified by any of the many processes and techniques utilized or available to those skilled in the art of processing nondairy fats and oils.

It is preferred that the total lipoid content of the milk base does not exceed about 25 percent, by weight, of the milk, where sour cream is the desired product. Where less than about .12 percent of the bodying additive is monoglycerides, a minimum of about 8 percent, by weight, butterfat is necessary for a sufficiently firm-bodied product to result. I have found where the monoglyceride is added in amounts of .12 percent, by weight, of the milk, as little as .50 percent, by weight, lipoid need be present for the production of a sour cream product. The latter discovery is significant since a low calorie sour cream product is in great demand.

It will be understood that the "milk base" of the present invention as it applies to sour cream may be cream, milk, or skim milk. The skim milk may be either fresh skim milk, fresh skim milk fortified to any milk solids not fat content with skim milk powder, condensed skim milk, reconstituted skim milk powder, or condensed skim milk, or may consist wholly of reconstituted skim milk powder or condensed skim milk. Such base must, of course, contain at least .5 percent, by weight, lipoids (where the monoglycerides of the present invention are employed) or 8.0 percent, by weight, where starch is the sole bodying agent.

Additional adjuncts which optionally may be added along with acid stabilizers and bodying agents include sweetening agents which may be added during the dressing preparation include sucrose, maltose, dextrose, corn syrup solids, honey, molasses, sorbitol, and others. Such sweetening agents may be added in amounts up to about 10 percent, by weight. Other optional adjuncts are salt and flavoring agents such as starter distillate or diacetyl. The sweeteners, salt, and flavoring agents may be added to the basic ingredients before pasteurization, or after processing and cooling.

In accordance with the present specification, an equivalent artificially prepared milk consists of a water-base solution of proteins and preferably includes flavoring agents. Cows milk is itself an aqueous solution or suspension of protein (mainly casein), sugar (mostly lactose), and lipoid (butterfat). Acidification, whether by culturing or by direct acid additives, causes the protein to agglomerate and form a curd. Such phenomenon may be effected by preparing a water solution of protein and acidifying this solution to a pH of 4.0 to 4.9. The protein coagulates in the same manner that milk casein coagulates.

Such an agglomerate is an inferior substitute for that obtained by the acidification of an animal milk, even where flavoring adjuncts are included, however, I have discovered that where the special glyceride additive is employed in the manner set forth in the present specification a surprisingly acceptable sour cream is obtained while using such a milk substitute. This phenomenon is particularly significant because a more consistently uniform and economical sour cream product may be reproduced since accurate ingredient controls is possible and milk processing is unnecessary.

Obvious protein additions that are disposed to form milk substitutes when combined with water are the caseinates (acid casein, sodium caseinate, potassium caseinate and ammonium caseinate). Other convenient protein source materials are peanut protein, soy protein and cottonseed protein. As stated above, these materials are useful as emulsifying agents for lipoids when added to milk. When utilized in the manufacture of artificial or synthetic milk, they provide the dual function of protein content and lipoid emulsifier.

The solids-not-fat content of skim milk consists of protein, about 75 percent of which is casein, plus natural flavoring agents (largely lactose). These solids range from about 5 to 13 percent, by weight, of the milk. Dry powdered skim milk is nearly 100 percent solids-not-fat. This material is composed of about 35 percent, by weight, total protein and about 57 percent milk lactose. The remainder consists of residual butterfat and mineral ask (K, Na etc.).

When producing a synthetic milk, the protein concentration may be varied widely to attain a wide variation in product. However, a preferred procedure is to substantially reproduce the protein content of skim milk by additives of at least about 1.75 percent, by weight, protein to water. The upper preferred limit is about 7 percent, by weight, although this exceeds the usual protein content of skim milk.

Relatively high molecular weight proteins such as those mentioned above readily coagulate within the pH range of from about 4.0 to 4.9 while some proteins (such as albumin, gelatin, egg yoke, wheat protein and zein protein) do not readily coagulate within this pH range. In effecting the present protein addition, proteins which do not readily coagulate within the aforementioned pH range may be combined with proteins that do so coagulate to produce a satisfactory synthetic product. So long as at least about .5 percent, by weight, of the total protein addition consists of a protein that is disposed to coagulate within the preferred pH range of 4.0 to 4.9 the balance of the total protein addition (1.75 percent to 7.00 percent, by weight) may consist of a protein that does not ordinarily coagulate within this pH range and a satisfactory product may be effected.

For optimum products when utilizing artificial milk, it is preferred to add sugars such as lactose to provide the taste qualities of the natural product. Such sweetening addition may be in the form of lactose, sucrose, glucose, or any other sweetening agent. The quality of such addition is not critical and may be varied widely in accordance with the desired ultimate product. Sweetening additives equivalent to from about 2½ percent, by weight, to 7 percent, by weight, lactose have been found to be satisfactory.

Other flavoring agents may be included.

In the manufacture of sour cream from a synthetic milk, the use of the special monoglyceride addition has been found to be preferred. Lipoids, such as those described above must be present within the range of from .5 to 25 percent, by weight. I have found that by following the above-described preferred embodiments, a particularly desirable firm bodied, nontacky sour-cream dressing may be obtained.

On methods for preparing the sour cream dressing of this invention is as follows:

(1) The milk base, lipoid material, bodying agent and acid stabilizer are mixed together with vigorous agitation to promote thorough mixing of the ingredients. The mixture is then warmed to about 80–125° F. to increase the mixing effectiveness of the ingredients.

(2) The product is then pasteurized. The pasteurizing temperature may vary from 143–195° F. for 0.30–0 minute for vat pasteurization or it can be done at 161–300° F. with a holding time of 0–60 seconds for HTST (high-temperature short-time).

(3) The pasteurized mixture is homogenized by any conventional homogenizing technique. Homogenization improves the body stability of the dressing product.

(4) The mixture is next cooled to about 32–110° F. before an edible acid is added with vigorous agitation in sufficient quantity to bring the pH to about 4.0–4.9. The temperature preferred for adding the acid is 40–75° F.

(5) Salt and flavoring such as starter distillates or diacetyl, onions, chives, etc. may next be added before the dressing product is packaged and refrigerated.

(6) Optional ingredients may be added to the basic ingredients before pasteurization. They include sweetening agents and emulsifying adjuncts.

In practicing the present invention when making sour cream I have found it to be particularly expedient to combine all additions but the acid addition into a single mixture. This mixture is commercially available under the trademark STABILAC which has the following composition:

| | Percent |
| --- | --- |
| Guar gum | 8.5 |
| Monoglyceride[1] | 44.1 |
| Salt (NaCl) | 6.5 |
| Sodium caseinate | 36.7 |
| Tripolyphosphate | 4.2 |

[1] 75 percent monoglyceride having an iodine value of approximately 20–60.

In utilizing this product for making sour cream, cream is standardized to 18–19 percent, by weight, butterfat. The above-recited mixture is added at the rate of 2 pounds to 10 gallons of cream accompanied with vigorous agitation. The mixture is then pasteurized at 175–180° F. for 0.30 minutes (or at 185–190° F. for 20–60 seconds if HTST system is used). The mixture is then homogenized at a temperature well above the melting point of the fat, using a pressure of 2500 pounds and cooled at 50–70° F. Citric acid solution (about 35 percent) is then added at a rate of 2 ounces per gallon. The mixture is agitated until all lumps are broken up and the cream is smooth. The cream may now be packaged and refrigerated.

An alternate procedure is to pasteurize and homogenize the 18–19 percent butterfat cream and then cool to 100° F. or lower before making the STABILAC addition at the rate of 2 pounds per 10 gallons (while agitating). The cream is then again pasteurized at 175–180° F. for 1–5 minutes. It is then cooled to 50–70° F. and set with citric acid solution as described above.

Party dips are made in the same manner substituting 12–15 percent butterfat cream for the 18–19 percent product, and adding the desired party dip flavor to the processed and cooled product.

The following specific examples illustrate the utilization of monoglycerides and an acid stabilizer in the production of sour cream.

EXAMPLE 1

0.20 pound of guar gum and 0.80 pound of special glyceride (which had a monoglyceride content of 80%, balance triglycerides) were added to 99.00 pounds of cream that contained approximately 19% butterfat.

The mixture was pasteurized, homogenized, and cooled to approximately 35–95° F. A 35%, by weight, aqueous solution of lactic acid was slowly added along with agitation to reduce the pH to 4.00 to 4.90. Salt and flavoring additions were also made. The product was packaged and stored under refrigeration.

EXAMPLE 2

An all vegetable dressing containing no dairy ingredients was prepared by adding the following ingredients to a processing vat:

| | Pounds |
| --- | --- |
| Water | 76.00 |
| Dextrose | 3.00 |
| Tapioca flour | 3.00 |
| Calcium carbonate | 0.25 |
| Salt (NaCl) | 0.25 |
| Guar gum | 0.25 |
| Sodium caseinate | 2.00 |
| Special monoglycerides | 1.25 |
| Partially hydrogenated vegetable oil, melting point approximately 80–120° F. | 14.00 |
| Total | 100.00 |

The above ingredients were blended in a batch tank, warmed to approximately 120° F. until the fat and special glycerides (about 60% monoglycerides, balance di and tri glycerides) were melted and were then thoroughly mixed. After pasteurizing, homogenizing and cooling the product proved to be a firm, nontacky commercially attractive sour cream.

While it was not shown by example, or pointed out previously, it is understood that the use of a carbonate salt to carbonate the finished product can be applied equally well in any of these formulations. Also, the adding of flavors, color and condiments to produce the desired organoleptic properties can readily be applied to any of these formulations to produce particular desired flavor characteristics in the finished product.

The following additional examples serve to illustrate the utilization of the process of the present invention in producing low fat content sour cream:

In preparing these products, the fat is standardized to the desired level and the desired amount of high-mono monoglycerides is added. The product is then pasteurized and homogenized in the conventional way and cooled (if desired) to approximately 40–90° F. then a solution of edible acid is added, sufficient to reduce the pH to approximately 4.0–4.9. The acid is mixed thoroughly with the cream until all lumps have disappeared. Then the product is packaged and stored under refrigeration.

EXAMPLE 3

An all-vegetable dressing containing no dairy ingredients was prepared in a processing vat. The resulting liquid mixture had the following, by weight, composition:

|  | Percent |
|---|---|
| Water | 85.0 |
| Partially hydrogenated vegetable oil | 7.5 |
| Dextrose | 2.5 |
| Sodium caseinate | 2.5 |
| Starch | 1.0 |
| Special monoglyceride (about 60% monoglyceride, balance di and triglycerides) | 1.5 |
| Total | 100.0 |

After pasteurizing and homogenizing in the usual fashion, the liquid mixture was cooled. Approximately 1.0%, by weight, of citric acid, sufficient to reduce the pH to from 4.0 to 4.8 was then thoroughly mixed with this liquid. The result was a firm bodied, nontacky sour cream.

EXAMPLE 4

An all-vegetable dressing containing no dairy ingredients was prepared in a processing vat. The resultant liquid mixture had the following, by weight, composition:

|  | Percent |
|---|---|
| Water | 89.5 |
| Partially hydrogenated vegetable oil | 2.0 |
| Sucrose | 2.5 |
| Soya protein | 2.5 |
| Starch | 1.0 |
| Special glycerides (about 60% monoglyceride, balance di and triglycerides) | 2.5 |
| Total | 100.0 |

After pasteurizing and homogenizing in the usual fashion, the liquid mixture was cooled to approximately 40–100° F. about 1%, by weight, of a 25% solution of citric acid was then added (sufficient to lower the pH to 4.0 to 4.8) and thoroughly mixed with the liquid. The result was firm bodied, nontacky sour cream.

In the application of the direct acid method for making cream and Neufchatel cheese type products, it will be appreciated that by acidifying a mixture of cream and known additives designed to meet Federal standards a product that meets these standards can be readily obtained. However, this product is a soft, wet, plastic material which has no similarity to the firm, hard, dry, short textured cheese-like body of cream or neufchatel cheese. This lack of cheese like body is overcome by the use of the additives of the present invention. The body and texture characteristics of my product are indistinguishable from that made by the conventional procedures ((a) and (b)) described above.

In the application of my additive for the purpose of making cream or Neufchatel cheese type products, starch may not be substituted for the high mono monodiglyceride additive. I have found the presence of monoglycerides to be essential to the production of a marketable product.

In employing my process to produce cream or Neufchatel cheese cream (preferably high butterfat animal milk) is a necessary basic ingredient. This may be either fresh sweet cream, frozen cream, or reconstituted cream from butter or butter oil and skim milk (either fresh or reconstituted). The cream is standardized to the desired butterfat content with skim milk, the stabilizing ingredients are added and mixed and the mixture is then acidified preferably with one or more of the above mentioned edible acids (no more than 5%, by weight, of cream).

The high mono monodiglycerides employed in the manufacture of cream cheese or Neufchatel cheese is the same as that employed for the manufacture of sour cream except that the ratio of monoglycerides to diglycerides can be as low as 5 to 4 (instead of 5:3 when used in the production of sour cream). At least 0.50 percent, by weight, of the mono diglyceride addition must be employed to provide a marketable product, while as much as 7.00 percent, by weight, can be used. In terms of monoglyceride alone this range would be from .27% to 7.00%, additions that exceed 7.00 percent, by weight, render a product that is excessively waxy which exhibits an undesirable salvy body.

Optional additives such as emulsifiers, hydrophilic colloid forming vegetable gums (including gelatin) flavoring agents, etc. are substantially the same as those employed for sour cream although some of these additives may differ in the quantity employed.

A basic difference between the production of sour cream and cream cheese lies in the butterfat or lipoid content of the starting material. Government regulations require a butterfat content of at least 33% for cream cheese and 20% for Neufchatel cheese. Although the maximum butterfat or lipoid content of sour cream (25%, by weight) overlaps that of cream and Neufchatel cheese (20%, by weight, minimum), the water content of Neufchatel and cream cheese is carefully controlled during processing (temperature of pasteurization, strength of acid used) to produce a lower water (lipoid to water ratio) content in the final product.

One of the significant advantages of the method of my invention as it applies to the manufacture of cream or Neufchatel cheese type products is that it is adaptable to modern automated processing techniques. The ingredients may be added to a batch tank to effect precise standardization of the composition of the finished product. The mixture may be pasteurized by any desired means including ultra high temperature sterilization. It may be homogenized at any desired stage in the process, and may be rehomogenized to bring out a desired body characteristic. Preferably the product is cooled before acidification, but acidification can be accomplished in the hot product at any stage of the heating cycle.

The variations that can be devised in the sequence of processing steps is almost without limit. A number of these variations are given below:

(1) Vat Pasteurize, homogenize, cool, acidify, package:

Make up batch in pasteurizing vat. Heat to 160°–195° F. for 30–0 minutes, as desired. Homogenize. Cool to 80°–40° F. Add food grade acid solution to pH of approximately 4.75. Mix thoroughly. Package. Store under refrigeration.

(2) Vat pasteurize, cool, acidify, homogenize, package:

Make up batch in pasteurizing vat. Heat to 160°–195° F. for 30–0 minutes, as desired. Cool to 80°–40° F. Add food grade acid solution to pH of approximately 4.75. Mix thoroughly. Homogenize. Package. Store under refrigeration.

(3) HTST pasteurize, homogenize, cool, acidify, package:

Add ingredients to batch tank. Pasteurize at 170°–300° F. for 60–0 seconds. Homogenize. Cool to 80°–40° F. Add food grade acid solution to pH of approximately 4.75 and mix thoroughly. Package. Store under refrigeration. If product was sterilized and food acid added aseptically, product need not be stored under refrigeration.

(4) HTST pasteurize, homogenize, cool, acidify, homogenize, package:

Add ingredients to batch tank. Pasteurize at 170°–300° F. for 60 to 0 seconds. Homogenize. Cool to 80°–40° F. Add food grade acid solution to pH of approximately 4.75. Homogenize. Package. If product was not sterilized and aseptically acidified, it must be stored under refrigeration.

(5) HTST pasteurize, cool, acidify, homogenize, package:

Add ingredients to batch tank. Pasteurize at 170°–300° F. for 60–0 seconds. Cool to 80°–40° F. Add food grade acid solution to pH of about 4.75. Homogenize. Package. If product was not sterilized and aseptically acidified, it must be stored under refrigeration.

(6) HTST pasteurize, acidify, homogenize, package:

Add ingredients to batch tank. Pasteurize at 170°–300° F. for 60–0 seconds. Add food grade acid solution at temperature of 170° F. or above. Homogenize. Package. If product was sterilized (heated to a temperature of 250–300° F.) it need not be stored under refrigeration.

(7) HTST pasteurize, acidify, homogenize, cool, homogenize, package:

Add ingredients to batch tank. Pasteurize at 170°–300° F. for 60–0 seconds. Add food grade acid solution to pH of about 4.75. Homogenize. Cool to 80°–40° F. Homogenize. Package. If product was not sterilized and acid solution added aseptically, the product must be stored under refrigeration.

(8) HTST pasteurize, homogenize, acidify, cool, homogenize, package:

Add ingredients to batch tank. Pasteurize at 170°–300° F. for 60–0 seconds. Homogenize. Add food grade acid solution to pH of about 4.75. Cool to 80°–40° F. Homogenize. Package. If product was not sterilized and acidified aseptically, the product must be stored under refrigeration.

The food acid solution used to acidify the sour cream is normally sterile. All that is required for sterile processing is to sterilize the product, add the acid solution aseptically so as to avoid contaminating the product with live microorganisms, and package into sterile containers.

However, in the event the food acid solution was not sterile, or if the cream cheese manufacturer wanted to take extra precautions, the food acid solution may be sterilized by any available means; heat, chemicals, radiation, etc., and added aseptically to the product. In the event the food acid solution has been sterilized by heat, then it should be cooled to approximately the temperature of the cheese product before using.

One of the major uses of cream cheese is in making cheese cake. Many experimental cream cheeses made by my process have been tested in making cheese cake and produced cheese cake comparable in every way to the very best cheese cakes commercially available in retail markets. Also, cheese cakes made with my new process cream cheese withstood freezing and prolonged frozen storage as well as those made with conventional cream cheese.

The following outline sets forth the composition of cream cheese, Neufchatel cheese, non-butterfat imitation cream and Neufchatel cheese type products, and non-dairy imitation cream and Neufchatel cheese type products. This outline discloses the basic composition, the critical limits of the special monoglyceride, and the approximate practical usage range of the optional ingredients.

The processing flow sheet for sour cream is suitable for sterile processing of cream cheese and related products by my method. It might be desirable to move the homogenization step to a different stage in the processing for cream cheese, and under certain conditions it may be desirable to add a second homogenizer so that the product can be given a second homogenization.

*Product composition—cream cheese*

Federal standards: Percent
   Butterfat (minimum) _____ 33.00
   Moisture (maximum) _____ 55.00
Basic ingredients:
   Butterfat and milk solids not fat
Additives:
   Optional—preferred—
      Dispersible caseinate: 0.00% to about 8.00%. Limitation: Hard, heavy body, high viscosity in the mix, grainy texture. May be sodium, potassium, calcium, ammonium caseinate or soft acid casein prepared by high rennet-low temperature coagulation method described in previous cottage cheese application.
      Dispersible vegetable protein concentrates: 0.00% to about 5.00%. Limitation: Hard, heavy body and vegetable protein flavor. May be sodium, potassium, calcium, or ammonia proteinate.
      Added milk solids not fat: About 0.00% to about 7.00%. Limitation: Soft, wet body, stringy body, grainy texture, milk powder flavor.
      Sweet dairy whey powder: 0.00% to about 7.00%. Limitations: Wet, soft or stringy body, and off flavor.
      Soluble carbohydrates: 0.00% to about 5.00%. Limitations: Excessive sweetness. May be lactose, dextrose, sucrose, corn syrup solids, sorbitol, or mixtures of two or more of above.
      Vegetable gums: 0.00% to about 1.00%. Limitation: Excessively high processing viscosity and hard, heavy body of finished product. May be locust bean gum, guar gum, CMC, carrageenan, furcelleran extract, gum tragacanth, gum arabic, agar agar, algin, propylene glycol alginate, and gelatin.
      Salt: 0.00% to about 1.00%. Limitation: Flavor.
      Spices, flavors and condiments: As desired.
   Critical—
      Special monoglycerides: About 0.50% to about 7.00%. Limitations: Excessively waxy, salvy body. Specifications: Same as in previous sour cream application, except ratio of monoglycerides to diglycerides can be as low as 5 to 4 instead of 5 to 3.

*Product composition—Neufchatel cheese*

Federal standards: Percent
   Butterfat (minimum) _____ 20.00
   Moisture (maximum) _____ 65.00
Basic ingredients:
   Butterfat and milk solids not fat
Additives:
   Optional—Same as for cream cheese
   Critical—Same as for cream cheese

*Product composition—Cheese spreads and related products*

Same as for Neufchatel cheese, except no Federal standards for butterfat and moisture.

*Product composition—Non-butterfat imitation cream and Neufchatel cheese products*

Basic ingredients:
   Non-butterfat lipoid, selected from list of fatty substances described in non-butterfat imitation sour cream application.
   Milk solids not fat.
Additives:
   Optional—Same as for cream cheese.
   Critical—Same as for cream cheese.

*Product compositions—Non-dairy imitation cream and Neufchatel cheese products*

Basic ingredients:
    Non-butterfat lipoid, selected from list of fatty substances described in non-butterfat imitation sour cream application.
    Water Additives:
    Optional—preferred—
        Dispersible caseinate: Some as for cream cheese.
        Dispersible vegetable protein concentrate: Some as for cream cheese.
        Soluble carbohydrates: 0.00% to about 8.00%. Same as for cream cheese.
        Chemical sweeteners: 0.00% to about 0.30% saccharine, sodium or calcium cyclamate, or hexamic acid. Limitation: Chemical after taste.
        Dispersible carbohydrates: 0.00% to about 5.00%. Tapioca, flour, starch, or modified starch. Limitation: High processing viscosity, hard body.
        Vegetable gums: Same as for cream cheese.
        Salt: Same as for cream cheese.
        Spices, flavors, and condiments: As desired.
    Critical—
        Special monoglycerides: Same as for cream cheese.

EXAMPLES
CREAM CHEESE EXAMPLES

| Formula | Percent | Percent Fat | Percent Water |
|---|---|---|---|
| (1) 40% by weight, butterfat cream | 82.50 | 33.00 | 45.04 |
| Skim milk | 11.25 | | 10.27 |
| Non-Fat Dry Milk | 2.50 | | 0.08 |
| Sodium Caseinate | 1.00 | | 0.05 |
| Salt | 0.75 | | |
| Special Monoglyceride | 2.00 | | |
| Total | 100.00 | 33.00 | 55.44 |
| (2) 40% Cream | 82.50 | 33.00 | 45.04 |
| Skim Milk | 11.25 | | 10.27 |
| Sweet Dairy Whey | 2.50 | | 0.13 |
| Sodium Caseinate | 1.00 | | 0.08 |
| Salt | 0.75 | | |
| Special Monoglyceride | 2.00 | | |
| Total | 100.00 | 33.00 | 55.52 |
| (3) 40% Cream | 85.00 | 34.00 | 46.48 |
| Skim Milk | 7.25 | | 6.62 |
| Sodium Caseinate | 5.00 | | 0.25 |
| Salt | 0.75 | | |
| Special Monoglyceride | 2.00 | | |
| Total | 100.00 | 34.00 | 53.35 |
| (4) 40% Cream | 85.00 | 34.00 | 46.48 |
| Skim Milk | 10.25 | | 9.36 |
| Sodium Caseinate | 2.00 | | 0.10 |
| Salt | 0.75 | | |
| Special Monoglyceride | 2.00 | | |
| Total | 100.00 | 34.00 | 55.94 |
| (5) 40% Cream | 85.00 | 34.00 | 46.48 |
| Skim Milk | 9.60 | | 8.77 |
| Salt | 0.75 | | |
| Guar Gum | 0.15 | | |
| Sweet Dairy Whey | 2.50 | | 0.13 |
| Special Monoglyceride | 2.00 | | |
| Total | 100.00 | 34.00 | 55.38 |
| (6) 40% Cream | 85.00 | 34.00 | 46.48 |
| Skim Milk | 9.60 | | 8.77 |
| Salt | 0.75 | | |
| Guar Gum | 0.15 | | |
| Dextrose | 2.50 | | |
| Special Monoglyceride | 2.00 | | |
| Total | 100.00 | 34.00 | 55.25 |
| (7) 40% Cream | 85.00 | 34.00 | 46.48 |
| Skim Milk | 9.60 | | 8.77 |
| Salt | 0.75 | | |
| Guar Gum | 0.15 | | |
| Sorbitol | 2.50 | | |
| Special Monoglyceride | 2.00 | | |
| Total | 100.00 | 34.00 | 55.25 |

EXAMPLES
CREAM CHEESE EXAMPLES

| Formula | Percent | Percent Fat | Percent Water |
|---|---|---|---|
| (8) 40% Cream | 85.00 | 34.00 | 46.48 |
| Skim Milk | 9.60 | | 8.77 |
| Salt | 0.75 | | |
| Guar Gum | 0.15 | | |
| Soya Protein | 2.50 | | |
| Special Monoglyceride | 2.00 | | |
| Total | 100.00 | 34.00 | 55.25 |
| (9) 40% Cream | 85.00 | 34.00 | 46.48 |
| Skim Milk | 12.10 | | 11.05 |
| Sodium Caseinate | 1.00 | | 0.05 |
| Guar Gum | 0.15 | | |
| Salt | 0.75 | | |
| Special Monoglyceride | 1.00 | | |
| Total | 100.00 | 34.00 | 57.56 |
| (10) 32% Cream | 94.25 | 30.16 | 59.84 |
| Sodium Caseinate | 2.00 | | 0.10 |
| Salt | 0.75 | | |
| Non-Fat Dry Milk | 2.00 | | 0.06 |
| Special Monoglyceride | 1.00 | | |
| Total | 100.00 | 30.16 | 60.00 |

NEUFCHATEL AND CHEESE SPREAD EXAMPLES

| Formula | Percent | Percent Fat | Percent Water |
|---|---|---|---|
| (11) 40% Cream | 50.00 | 20.00 | 27.30 |
| Skim Milk | 42.25 | | 38.45 |
| Sodium Caseinate | 5.00 | | 0.25 |
| Salt | 0.75 | | |
| Special Monoglyceride | 2.00 | | |
| Total | 100.00 | 20.00 | 66.00 |
| (12) 40% Cream | 50.00 | 20.00 | 27.30 |
| Skim Milk | 40.25 | | 36.63 |
| Non-Fat Dry Milk | 2.00 | | 0.06 |
| Sodium Caseinate | 5.00 | | 0.25 |
| Salt | 0.75 | | |
| Special Monoglyceride | 2.00 | | |
| Total | 100.00 | 20.00 | 64.24 |
| (13) 40% Cream | 50.00 | 20.00 | 27.30 |
| Skim Milk | 40.25 | | 36.63 |
| Sweet Dairy Whey Powder | 3.00 | | 0.09 |
| Sodium Caseinate | 4.00 | | 0.20 |
| Salt | 0.75 | | |
| Special Monoglyceride | 2.00 | | |
| Total | 100.00 | 20.00 | 64.22 |
| (14) 40% Cream | 50.00 | 20.00 | 27.30 |
| Skim Milk | 40.25 | | 36.63 |
| Sodium Caseinate | 3.00 | | 0.15 |
| Soya Protein Concentrate | 3.00 | | 0.30 |
| Salt | 0.75 | | |
| Special Monoglyceride | 3.00 | | |
| Total | 100.00 | 20.00 | 64.38 |
| (15) 40% Cream | 40.00 | 16.00 | 21.84 |
| Skim Milk | 50.10 | | 45.59 |
| Sweet Dairy Whey Powder | 3.00 | | 0.09 |
| Soya Protein Concentrate | 3.00 | | 0.30 |
| Salt | 0.75 | | |
| Guar Gum | 0.15 | | |
| Special Monoglyceride | 3.00 | | |
| Total | 100.00 | 16.00 | 67.82 |
| (16) 40% Cream | 40.00 | 16.00 | 21.84 |
| Skim Milk | 53.00 | | 48.23 |
| Sodium Caseinate | 5.00 | | 0.25 |
| Salt | 0.75 | | |
| Guar Gum | 0.25 | | |
| Special Monoglyceride | 1.00 | | |
| Total | 100.00 | 16.00 | 70.32 |

VEGETABLE FAT IMITATION CREAM AND NEUFCHATEL CHEESE PRODUCTS

| Formula | Percent | Percent Fat | Percent Water |
|---|---|---|---|
| (17) Prime Steamed Lard | 34.00 | 34.00 | |
| Skim Milk | 61.25 | | 55.74 |
| Sodium Caseinate | 2.00 | | 0.10 |
| Salt | 0.75 | | |
| Special Monoglyceride | 2.00 | | |
| Total | 100.00 | 34.00 | 55.84 |
| (18) Vegetable Fat | 34.00 | 34.00 | |
| Skim Milk | 59.10 | | 53.43 |
| Non-Fat Dry Milk | 2.00 | | 0.06 |
| Sodium Caseinate | 3.00 | | 0.15 |
| Salt | 0.75 | | |
| Locust Bean Gum | 0.15 | | |
| Special Monoglyceride | 1.00 | | |
| Total | 100.00 | 34.00 | 53.64 |

VEGETABLE FAT IMITATION CREAM AND NEUFCHATEL CHEESE PRODUCTS—Continued

| Formula | Percent | Percent Fat | Percent Water |
|---|---|---|---|
| (19) Non Butterfat Lipoid | 34.00 | 34.00 | |
| Skim Milk | 61.10 | | 55.53 |
| Sodium Caseinate | 3.00 | | 0.15 |
| Guar Gum | 0.15 | | |
| Salt | 0.75 | | |
| Special Monoglyceride | 1.00 | | |
| Total | 100.00 | 34.00 | 55.68 |
| (20) Vegetable Fat | 20.00 | 20.00 | |
| Skim Milk | 71.60 | | 65.16 |
| Soya Protein Concentrate | 3.00 | | 0.15 |
| Sweet Dairy Whey Powder | 2.50 | | 0.10 |
| Locust Bean Gum | 0.15 | | |
| Salt | 0.75 | | |
| Special Monoglyceride | 2.00 | | |
| Total | 100.00 | 20.00 | 65.41 |
| (21) Vegetable Fat | 15.00 | 15.00 | |
| Skim Milk | 75.50 | | 68.71 |
| Sodium Caseinate | 3.00 | | 0.15 |
| Sweet Dairy Whey Powder | 2.50 | | 0.10 |
| Guar Gum | 0.25 | | |
| Salt | 0.75 | | |
| Special Monoglyceride | 3.00 | | |
| Total | 100.00 | 15.00 | 68.96 |
| (22) Non-Butterfat Lipoid | 34.00 | 34.00 | |
| Sodium Caseinate | 4.00 | | 0.20 |
| Dextrose | 4.50 | | 0.40 |
| Salt | 0.75 | | |
| Locust Bean Gum | 0.15 | | |
| Special Monoglyceride | 2.00 | | |
| Water | 54.60 | | 54.60 |
| Total | 100.00 | 34.00 | 55.20 |
| (23) Vegetable Fat | 34.00 | 34.00 | |
| Sodium Caseinate | 3.00 | | 0.15 |
| Soya Protein Concentrate | 2.00 | | 0.10 |
| Dextrose | 5.00 | | 0.50 |
| Salt | 0.75 | | |
| Special Monoglyceride | 1.00 | | |
| Water | 54.25 | | 54.25 |
| Total | 100.00 | 34.00 | 55.00 |
| (24) Vegetable Fat | 20.00 | 20.00 | |
| Sodium Caseinate | 5.00 | | 0.25 |
| Vegetable Protein Concentrate | 2.00 | | 0.15 |
| Dextrose | 5.00 | | 0.50 |
| Salt | 0.75 | | |
| Guar Gum | 0.25 | | |
| Special Monoglyceride | 2.00 | | |
| Water | 65.00 | | 65.00 |
| Total | 100.00 | 20.00 | 65.90 |
| (25) Vegetable Fat | 16.00 | 16.00 | |
| Soya Protein Concentrate | 3.00 | | 0.15 |
| Tapioca Flour | 2.00 | | 0.20 |
| Sorbitol | 5.00 | | 0.35 |
| Salt | 0.75 | | |
| Furcelleron Extract | 0.10 | | |
| Special Monoglyceride | 1.00 | | |
| Water | 70.15 | | 70.15 |
| Total | 100.00 | 16.00 | 70.85 |

It will be noted that the examples illustrating the manufacture of cream and Neufchatel cheese appear to be identical to those which illustrate the manufacture of sour cream. It will be understood that the method of the present invention relates to the manufacture of milk coagulum of the sour cream and cream cheese type (including Neufchatel cheese) and includes intermediate products regardless of the name assigned (cheese spread, sour cream dip, etc.). The essential distinguishing feature between the products is the ratio of water to total solids. Generally, cream or Neufchatel cheese will exhibit a water to total solids ratio of no greater than about 2.20:1 while sour cream may exhibit a water to solids content as high as 9.00:1. Optimum sour cream ratios will be somewhere in between (2.20:1–9.00:1) but intermediate coagulum products having water to solid ratios near 2.20:1 may be referred to a cream cheese, sour cream, Neufchatel cheese, cheese spread, cheese dip, etc. The minimum practical water to solids content of cream cheese would be somewhere near the ratio of 1.00:1.

Table I, below, shows the water to total solids ratios for cream cheese made by my process (Examples 1 through 25) and for conventionally processed cream cheese. The cream cheese Examples 1 through 14, 17 through 20 and 22 through 24 were processed in accordance with various of the eight processing procedures given above, the Formulas 1 through 14, 17 through 20 and 22 through 24 below correspond to cream cheese Examples 1 through 14, 17 through 20 and 22 through 24 respectively (each formula identifying the numbered processing procedure utilized).

The acidifying solutions used to acidify the examples of Formulations 1 through 24 follow, are numbered 1 through 5 and are so identified in the formulations (examples). The acid additions, as in the case of sour cream, should constitute no more than about 5 percent, by weight, of the milk.

ACIDIFYING SOLUTIONS

No. 1: By volume
Lactic acid, 88% ------ 35
Water ------ 65

Total ------ 100

No. 2: Gallons
Lactic acid, 88% ------ 95
Imitation culture flavor ------ 5

Total ------ 100

No. 3: Pounds
Malic acid ------ 232
Glacial acetic acid ------ 32
Propionic acid ------ 8
Water ------ 603

Total (100 gallons) ------ 875

No. 4:
Citric acid, anhydrous, pounds ------ 500
Water, pounds ------ 140
Imitation culture flavor, gallons ------ 3½

Total, gallons ------ 182

No. 5: Gallons
Lactic acid, 88% ------ 35
Starter distillate ------ 40
Water ------ 25

Total ------ 100

The following outline combines the formulas, the processing procedures and the acidifying solution for all examples.

*Formula 1.*—Process No. 1. Make up batch in pasteurizing vat. Heat to 160–195° F. for 30–0 minutes, as desired. Homogenize. Cool to 80–40° F. Add acid solution No. 5 at the rate of approximately 1.25 ounces per gallon, sufficient to give a pH of approximately 4.7–4.8. Mix thoroughly. Package. Store under refrigeration.

*Formula 2.*—Process No. 2. Make up batch in pasteurizing vat. Heat to 160–195° F. for 30–0 minutes, as desired. Cool to 80–40° F. Add acid solution No. 4 at approximately 1.25 ounces per gallon, sufficient to give a pH of approximately 4.75. Mix thoroughly. Homogenize. Package. Store under refrigeration.

*Formula 3.*—Process No. 3. Add ingredients to batch tank. Pasteurize at 170–300° F. for 60–0 seconds. Homogenize. Cool to 80–40° F. Add acid solution No. 3 at the rate of approximately 1.50 ounces per gallon to a pH of approximately 4.60–4.90. Mix thoroughly. Package. Store under refrigeration.

*Formula 4.*—Process No. 4. Add ingredients to batch tank. Pasteurize at 265–300° F. for 5–0 seconds. Homogenize. Cool to 80–40° F. Add acid solution No. 2 at the rate of approximately 0.75 ounce per gallon, added aseptically to avoid contaminating the sterile product, to a pH of approximately 4.60–4.80. Homogenize. Package. The product may be stored in a cool, unrefrigerated warehouse.

*Formula 5.*—Process No. 5. Add ingredients to batch tank. Pasteurize at 170–200° F. for 30–0 seconds. Cool to 80–40° F. Add acid solution No. 1 at the rate of approximately 1.25 ounces per gallon, sufficient to reduce the pH of the product to approximately 4.00–5.10. Homogenize. Package. Store under refrigeration.

*Formula 6.*—Process No. 6. Add ingredients to a batch tank. Pasteurize at 170–220° F. for 30–5 seconds. Add acid solution No. 2 at the rate of approximately 0.80 ounce per gallon, sufficient to reduce the pH of the product to approximately 4.50–4.90. The acid solution should be added to the product at a temperature of 170° or above. Homogenize. Package. The product will be pasteurized and semi-sterilized, and may be shipped in non-refrigerated transportation, but should be stored in refrigerated warehouses.

*Formula 7.*—Process No. 7. Add ingredients to batch tank. Pasteurize at 200–250° F. for 15–5 seconds. Add acid solution No. 1 at the rate of approximately 1.25 ounces per gallon, sufficient to reduce the pH of the product to the range of 4.20–4.80. Add the acid solution to the product at a temperature of 170° or above. Homogenize. Cool to 80–40°. Homogenize. Package aseptically. The product will be semi-sterile and may be shipped without refrigeration and stored for a brief period in unrefrigerated warehouses.

*Formula 8.*—Process No. 8. Add ingredients to batch tank. Pasteurize at 170–180° F. for 60 seconds. Homogenize. Add acid solution No. 3 at the rate of approximately 1.35 ounces per gallon, sufficient to reduce the pH to approximately 4.50–4.75. Cool to 80–40° F. Homogenize. Package. Store under refrigeration.

*Formula 9.*—Process No. 8. Add ingredients to the batch tank. Pasteurize at 265–500° F. for 10–5 seconds. Cool to 170°. Homogenize. Add acid solution No. 3 at the rate of approximately 1.75 ounces per gallon, sufficient to reduce the pH of the product to approximately 4.50–4.80. Cool to 80–40° F. Homogenize. Package aseptically. The product will be sterile and may be shipped, stored, and displayed without refrigeration.

*Formula 10.*—Process No. 7. Add ingredients to the batch tank. Pasteurize at 170–200° F. for 60–15 seconds. Add acid solution No. 3 at the rate of approximately 1.60 ounces per gallon, sufficient to reduce the pH to approximately 4.60–4.90. Homogenize. Cool to 80–40°. Homogenize. Package and store under refrigeration.

*Formula 11.*—Process No. 6. Add ingredients to the batch tank. Pasteurize at 170–200° F. for 60–0 seconds. Add acid solution No. 2 at the rate of approximately 0.65 ounce per gallon, sufficient to reduce the pH to approximately 4.50–4.80. Add the acid solution at a temperature of 170° or above. Homogenize. Package. The product will be semi-sterile and can be shipped and displayed without refrigeration, but prolonged warehouse storage should be under refrigeration.

*Formula 12.*—Process No. 5. Add ingredients to batch tank. Heat to a temperature of 280–300° for 5–0 seconds. Cool to 80–40°. Add the acid solution No. 1 which has previously been sterilized by heating to about 160° or above and cooled to about 100° or lower, at the rate of approximately 1½ ounces per gallon, sufficient to reduce the pH to approximately 4.25–4.75. The sterile acid solution should be added aseptically. Homogenize. Package aseptically. The product will be sterile and may be shipped, warehoused, and displayed without refrigeration.

*Formula 13.*—Process No. 4. Add ingredients to batch tank. Pasteurize at 170–200° F. for 60–10 seconds. Homogenize. Cool to 80–40°. Add acid solution No. 3 at the rate of approximately 1.50 ounces per gallon, sufficient to reduce the pH to approximately 4.60–4.90. Homogenize. Package. Store under refrigeration.

*Formula 14.*—Process No. 3. Add ingredients to batch tank. Pasteurize at 161–200° F. for 30–10 seconds. Homogenize. Cool to 80–40°. Add acid solution No. 6 at the rate of approximately 1.50 ounces per gallon sufficient to reduce the pH to approximately 4.50–5.00. Package and store under refrigeration.

*Formula 17.*—Process No. 2. Make up batch in pasteurizing vat. Heat to 160–195° F. for 30–0 minutes, as desired. Cool to 80–40°. Add acid solution No. 3 at the rate of 1.25 ounces per gallon, sufficient to reduce the pH to approximately 4.40–4.80. Mix thoroughly. Homogenize. Package. Store under refrigeration.

*Formula 18.*—Process No. 1. Make up batch in pasteurizing vat. Heat to 160–195° F. for 30 to 0 minutes, as desired. Homogenize. Cool to 80–40°. Add acid solution No. 6 at the rate of approximately 1.25 ounces per gallon, sufficient to reduce the pH to approximately 4.75. Mix thoroughly. Package. Store under refrigeration.

*Formula 19.*—Process No. 1. Add ingredients to the pasteurizing vat. Heat to 160–190° for 30–0 minutes as desired. Homogenize. Cool to 80–40°. Add acid solution No. 1 at the rate of 1.35 ounces per gallon, sufficient to reduce the pH to approximately 4.25–4.85. Mix thoroughly. Package. Store under refrigeration.

*Formula 20.*—Process No. 3. Add ingredients to batch tank. Pasteurize at 170–200° F. for 60–30 seconds. Homogenize. Cool to 80–40°. Add acid solution No. 4 at the rate of approximately 1.25 ounces per gallon, sufficient to reduce the pH to approximately 4.00–5.00. Mix thoroughly. Package and store under refrigeration.

*Formula 22.*—Process No. 5. Add ingredients to batch tank. Pasteurize at 161–200° F. for 60–30 seconds. Cool to 80–40°. Add acid solution No. 5 at the rate of approximately 1.25 ounces per gallon, sufficient to reduce the pH to approximately 4.30–4.90. Homogenize. Package. Store under refrigeration.

*Formula 23.*—Process No. 4. Add ingredients to batch tank. Pasteurize at 161–200° F. for 60–30 seconds. Homogenize. Cool to 80–40° F. Add acid solution No. 2 at the rate of 0.75 ounce per gallon, sufficient to reduce the pH to approximately 4.50–4.75. Homogenize. Package. Store under refrigeration.

*Formula 24.*—Process No. 5. Add ingredients to the batch tank. Pasteurize at 170–200° F. for 60–30 seconds. Cool to 80–40°. Add food grade acid solution (Formula No. 3 of Table II) at the rate of approximately 1.25 ounces per gallon, sufficient to reduce the pH to approximately 4.00–5.00. Homogenize. Package. Store under refrigeration.

*Cream cheese products*

TABLE I.—RATIO OF WATER TO TOTAL SOLIDS

| Formula No. | Cream Cheese Disclosure | | |
|---|---|---|---|
| | Percent Water | Percent Total Solids | Ratio, Water/Total Solids |
| 1 | 55.44 | 44.56 | 1.25:1 |
| 2 | 55.52 | 44.48 | 1.25:1 |
| 3 | 53.35 | 46.65 | 1.15:1 |
| 4 | 55.94 | 44.06 | 1.25:1 |
| 5 | 55.38 | 44.52 | 1.25:1 |
| 6 | 55.25 | 44.75 | 1.24:1 |
| 7 | 55.25 | 44.75 | 1.24:1 |
| 8 | 55.25 | 44.75 | 1.24:1 |
| 9 | 57.56 | 42.44 | 1.36:1 |
| 10 | 60.00 | 40.00 | 1.50:1 |
| 11 | 66.00 | 34.00 | 1.95:1 |
| 12 | 64.24 | 35.76 | 1.80:1 |
| 13 | 64.22 | 35.78 | 1.80:1 |
| 14 | 64.38 | 35.62 | 1.81:1 |
| 15 | 67.82 | 32.18 | 2.11:1 |
| 16 | 70.32 | 29.68 | 2.37:1 |
| 17 | 55.84 | 44.16 | 1.27:1 |
| 18 | 53.64 | 46.36 | 1.16:1 |
| 19 | 55.68 | 44.32 | 1.26:1 |
| 20 | 65.41 | 34.59 | 1.89:1 |
| 21 | 68.96 | 31.04 | 2.22:1 |
| 22 | 55.20 | 44.48 | 1.24:1 |
| 23 | 55.00 | 45.00 | 1.22:1 |
| 24 | 65.90 | 34.10 | 1.93:1 |
| 25 | 70.85 | 29.15 | 2.43:1 |
| Typical Conventional Cream Cheese | 54.00 | 46.00 | 1.18:1 |
| Typical Conventional Neufchatel Cheese | 64.00 | 36.00 | 1.78:1 |

SUMMARY EXAMPLES 1-25

| | | | |
|---|---|---|---|
| Minimum Ratio | | | 1.15:1 |
| Maximum Ratio | | | 2.43:1 |

Only four formulas (15, 16, 21, 25) are over 2.00:1 (highest ratio outside of 15, 16, 21, 25 is No. 11 at 1.95:1).

Table II below shows data derived from the products of Examples 1 through 14 given above which relate to the production of sour cream. The data relating to a typical cultured sour cream was from a cultured cream containing 22 percent butterfat and 3 percent added milk solids.

TABLE II.—RATIO OF WATER TO TOTAL SOLIDS

| Example No. | Special Monoglycerides Patent Application | | |
|---|---|---|---|
| | Percent Water | Percent Total Solids | Ratio, Water/Total Solids |
| 1 | 74.20 | 25.80 | 2.89:1 |
| 2 | 79.10 | 20.90 | 3.82:1 |
| 3 | 77.35 | 22.65 | 3.42:1 |
| 4 | 74.17 | 25.83 | 2.89:1 |
| 5 | 75.00 | 25.00 | 3.00:1 |
| 6 | 73.70 | 26.30 | 2.80:1 |
| 7 | 76.50 | 23.50 | 3.26:1 |
| 8 | 76.00 | 24.00 | 3.17:1 |
| 9 | 84.20 | 15.80 | 5.35:1 |
| 10 | 88.70 | 11.30 | 7.85:1 |
| 11 | 82.50 | 17.50 | 4.73:1 |
| 12 | 88.00 | 12.00 | 7.30:1 |
| 13 | 85.00 | 15.00 | 5.65:1 |
| 14 | 89.50 | 10.50 | 8.50:1 |
| Total Cultured Sour Cream | 73.70 | 26.30 | 2.80:1 |
| Cultured Sour Cream Containing 22% Butterfat | 71.00 | 29.00 | 2.45:1 |
| Cultured Sour Cream Containing 3% Added Milk Solids | 71.62 | 28.38 | 2.45:1 |

What is claimed is:

1. The process of making sour cream comprising:
  (a) adding from .20 to 3.00%, by weight, of mono-diglycerides having a monoglyceride to diglyceride ratio of at least 5:3 and .05% to 1.00%, by weight, of a hydrophilic colloid to an animal milk containing .50 to 25.00% lipoids;
  (b) pasteurizing and homogenizing; and thereafter
  (c) acidifying said milk to a pH of from about 4.0 to 4.9 with an edible acidifying addition that constitutes no more than about 5%, by weight, of said milk.

2. The process of claim 1 wherein said colloid consists of at least one material selected from the group of vegetable gums and gelatin.

3. The process of claim 1 wherein said lipoids consist essentially of butterfat.

4. The process of claim 1 wherein a portion of said mono-diglyceride over .20%, by weight, is replaced with starch.

5. The process of claim 1 wherein up to about 2.5%, by weight, of at least one emulsifying adjunct is added to said milk with said mono-diglycerides and colloid-forming addition.

6. The process of claim 5 wherein said emulsifying adjunct consists essentially of at least one material selected from the group of caseinates, lecithin, proteins, and neutral salts with polyvalent anions.

7. The process of claim 1 wherein said milk contains lipoids within the range of from 8.00% to 25.00%, by weight.

8. The process for making a sour cream type product comprising:
  (a) adding protein to water, said protein being disposed to coagulate within a pH range of from about 4.0 to 4.9;
  (b) adding from about .50 to 25.00%, by weight, lipoids to said water;
  (c) adding from .20 to 3.00%, by weight, of mono-diglycerides having a monoglyceride to diglyceride ratio of at least 5:3 and .05 to 1.00%, by weight, of a colloid to said water;
  (d) pasteurizing and homogenizing; and thereafter
  (e) acidifying the water and additions mixture to a pH of from about 4.0 to 4.9 with an edible acidifying addition that constitutes no more than about 5%, by weight, of said mixture.

9. The process of claim 8 wherein said protein is within the range of from about 1.75 to 7.00%, by weight.

10. The process of claim 9 wherein at least .50%, by weight, of said protein is disposed to coagulate within the pH range of 4.0 to 4.9.

11. The process of claim 8 wherein said protein is soya protein.

12. The process of making sour cream comprising:
  (a) adding from about .12 to 3.00%, by weight, starch and .05 to 1.00%, by weight, of a hydrophilic colloid to an animal milk containing 8.00 to 25.00%, by weight, lipoids;
  (b) pasteurizing and homogenizing; and thereafter
  (c) acidifying said milk to a pH of from about 4.0 to 4.9 with an edible acidifying addition that constitutes no more than about 5%, by weight, of said milk.

13. The process of claim 12 wherein said hydrophilic colloid consists of at least one material selected from the group of vegetable gums and gelatin.

14. The process of claim 12 wherein said lipoids consist essentially of butterfat.

15. The process of claim 12 wherein up to about 2.5%, by weight, of at least one emulsifying adjunct is added to said milk with said starch and colloid-forming addition.

16. The process of claim 15 wherein said emulsifying adjunct consists essentially of at least one material selected from the group of caseinates, lecithin, proteins, and neutral salts with polyvalent anions.

17. The process for making cheese of the cream and Neufchatel character comprising:
  (a) adding from .27 to 7.00% monoglyceride in the form of a mono-diglyceride that contains a ratio of monoglyceride to diglyceride of at least 5:4 to an animal milk that contains from 20 to 40%, by weight, lipoids;
  (b) pasteurizing and homogenizing; and thereafter
  (c) acidifying said milk to a pH of from about 4.0 to 4.9 with an edible acidifying addition that constitutes no more than about 5%, by weight, of said milk.

18. The process as set forth in claim 17 wherein up to about 2.5%, by weight, of at least one emulsifying adjunct selected from the group consisting of caseinates, lecithin, proteins, and neutral salts with polyvalent anions is added to said milk with said monoglycerides.

19. The process as set forth in claim 17 wherein said milk is a totally artificial product consisting of water from about 1.75 to 7.00%, by weight, protein at least .50%, by weight, of which is disposed to coagulate within the pH range of 4.0 to 4.9 and from 20 to 40%, by weight, dispersible lipoids.

20. The process as set forth in claim 17 wherein all of the ingredients are selected to yield a product having a water to solids ratio that is not greater than about 2.20:1.

(References on following page)

References Cited

UNITED STATES PATENTS

| | | | |
|---|---|---|---|
| 1,661,601 | 3/1928 | Dahlberg | 99—116 |
| 1,815,727 | 7/1931 | Reynolds et al. | 99—59 X |
| 2,217,699 | 10/1940 | Musher | 99—144 |
| 2,407,027 | 9/1946 | Mason et al. | 99—63 |
| 2,853,386 | 9/1958 | Hughes | 99—54 |
| 2,890,959 | 6/1959 | Phillips | 99—123 |
| 2,892,721 | 6/1959 | Nelson | 99—123 |
| 2,963,370 | 12/1960 | Roundy | 99—116 |
| 3,066,027 | 11/1962 | Perini et al. | 99—60 |
| 3,189,464 | 6/1965 | Heinemann | 99—116 |

FOREIGN PATENTS 677,531  8/1952  Great Britain.

LIONEL M. SHAPIRO, *Primary Examiner.*